(12) United States Patent
Köhler et al.

(10) Patent No.: US 10,781,870 B2
(45) Date of Patent: Sep. 22, 2020

(54) CONTROL UNIT FOR A MOTOR VEHICLE, AND METHOD TO CONTROL THE MOTOR VEHICLE

(71) Applicant: ZF Friedrichshafen AG, Friedrichshafen (DE)

(72) Inventors: Christoph Köhler, Bodolz (DE); Frank Deprez, Mariabrunn (DE); Pablo Ole Schmidt, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 153 days.

(21) Appl. No.: 16/131,586

(22) Filed: Sep. 14, 2018

(65) Prior Publication Data
US 2019/0085916 A1 Mar. 21, 2019

(30) Foreign Application Priority Data
Sep. 15, 2017 (DE) .......................... 10 2017 216 392

(51) Int. Cl.
*F16D 48/06* (2006.01)
*B60W 20/00* (2016.01)

(52) U.S. Cl.
CPC ............. *F16D 48/06* (2013.01); *B60W 20/00* (2013.01); *B60Y 2200/92* (2013.01);
(Continued)

(58) Field of Classification Search
CPC ............... F16D 48/06; F16D 2500/102; F16D 2500/104; F16D 2500/10406;
(Continued)

(56) References Cited

U.S. PATENT DOCUMENTS 8,142,328 B2  3/2012  Reuschel
9,527,505 B1  12/2016  Gibson et al.
(Continued)

FOREIGN PATENT DOCUMENTS

DE  102008030480 A1  1/2009
DE  102015113643 A1  3/2016
(Continued)

OTHER PUBLICATIONS

German Search Report DE102017216392.5 dated May 17, 2018. (12 pages).

*Primary Examiner* — Edwin A Young
(74) *Attorney, Agent, or Firm* — Dority & Manning, P.A.

(57) ABSTRACT

A method for operating a motor vehicle includes, when a target differential speed is set for a separating clutch (4), determining a power transmission factor depending on the target differential speed and an internal combustion engine-driven torque to be transmitted by the separating clutch (4). The method also includes determining an actuating pressure for the separating clutch (4) depending on the power transmission factor, controlling the separating clutch (4) with the actuating pressure, ascertaining an actual differential speed forming at the separating clutch (4) depending on the actuating pressure, determining a corrected power transmission factor with a controller (10) depending on a deviation between the target differential speed and the actual differential speed, determining a corrected actuating pressure for the separating clutch (4) depending on the corrected power transmission factor and the internal combustion engine-driven torque to be transmitted, and controlling the separating clutch (4) with the corrected actuating pressure.

10 Claims, 1 Drawing Sheet

(52) U.S. Cl.
CPC .......... *F16D 2500/102* (2013.01); *F16D 2500/1045* (2013.01); *F16D 2500/10412* (2013.01); *F16D 2500/3065* (2013.01); *F16D 2500/30406* (2013.01); *F16D 2500/7044* (2013.01); *F16D 2500/70406* (2013.01); *F16D 2500/70426* (2013.01)

(58) Field of Classification Search
CPC . F16D 2500/30406; F16D 2500/30412; F16D 2500/3065; F16D 2500/50239; F16D 2500/50293; F16D 2500/70426; F16D 250/7061
See application file for complete search history.

(56) References Cited

U.S. PATENT DOCUMENTS

| | | | |
|---|---|---|---|
| 9,656,666 B2 | 5/2017 | Wang et al. | |
| 2005/0056513 A1* | 3/2005 | Reuschel | B60W 30/1819 192/3.58 |
| 2010/0151990 A1 | 6/2010 | Seel | |
| 2014/0088813 A1* | 3/2014 | Kobayashi | B60K 6/547 701/22 |
| 2016/0125670 A1* | 5/2016 | Amano | B60W 30/18027 701/22 |
| 2017/0248179 A1* | 8/2017 | Park | F16D 48/066 |

FOREIGN PATENT DOCUMENTS

| | | |
|---|---|---|
| DE | 102016110992 A1 | 12/2016 |
| WO | WO 2008/107459 A2 | 9/2008 |

\* cited by examiner

CONTROL UNIT FOR A MOTOR VEHICLE, AND METHOD TO CONTROL THE MOTOR VEHICLE

FIELD OF THE INVENTION

The invention relates generally to a method for operating a motor vehicle and to a control unit for implementing the method.

BACKGROUND

Hybrid motor vehicles including a hybrid drive with an internal combustion engine and an electric motor or machine have been known from practical experience for a long time.

For example, DE 10 2008 030 480 A1 discloses a hybrid vehicle including an internal combustion engine and an electric machine, wherein a separating clutch is connected between the internal combustion engine and the electric machine. A transmission, namely an automatic or automated transmission, is connected between the hybrid drive and a driven end. DE 10 2008 030 480 A1 relates, in this case, to a method for operating such a hybrid vehicle, namely a method for starting the internal combustion engine, wherein the separating clutch connected between the internal combustion engine and the electric machine is controlled in a defined manner in order to start the internal combustion engine.

WO 2008/107459 A2 describes yet another method for operating a hybrid vehicle including an internal combustion engine, an electric machine, and a separating clutch connected between the internal combustion engine and the electric machine. This prior art relates to the transition from a purely electric operation into a hybrid operation of the motor vehicle.

It is known, in principle, from practical experience that the clutch connected between the internal combustion engine and the electric machine can be operated in a so-called slip decoupling in a hybrid vehicle in the hybrid operation, i.e., when the internal combustion engine as well as the electric machine are running and make drive torque available. In the slip decoupling, the separating clutch is controlled with a defined actuating pressure and, in fact, in such a way that a defined target differential speed is to set in at the separating clutch.

The approach taken for this purpose in practical experience is to determine a power transmission factor for the separating clutch depending on the desired, defined target differential speed and depending on an internal combustion engine-driven torque to be transmitted and to determine, depending on this power transmission factor, an actuating pressure for the separating clutch, with which the separating clutch is then controlled.

According to practical experience, the power transmission factor is determined on the basis of a characteristic map which is ascertained via testing and is implemented in a control device of the motor vehicle. This characteristic map can be ascertained on a test stand in such a way that the actuating pressure of the separating clutch at which the separating clutch can transmit the defined, internal combustion engine-driven torque while providing the desired target differential speed is determined for various internal combustion engine-driven torques and various target differential speeds at the clutch. The ratio of this internal combustion engine-driven torque and the actuating pressure determines, in this case, the power transmission factor of the separating clutch for the defined support point of torque to be transmitted and the target differential speed. In this case, power transmission factors are stored on the control side in the characteristic map for multiple support points of this type.

As described above, the determination of the power transmission factor is based on a previously empirically ascertained characteristic map. Due to component tolerances and wear, it is possible that the power transmission factor ascertained from such a characteristic map is too inaccurate and then the desired target slip or the target differential speed cannot set in at the separating clutch, and therefore, for example, the separating clutch breaks loose. This adversely affects the comfort.

Therefore, there is a need to operate a hybrid vehicle with higher comfort when the slip decoupling is active.

SUMMARY OF THE INVENTION

On the basis thereof, example aspects of the invention create a new type of method for operating a motor vehicle and of creating a control unit for operating a motor vehicle.

According to example aspects of the invention, when a defined target differential speed is to set in at the separating clutch, a power transmission factor is determined depending on the target differential speed and an internal combustion engine-driven torque to be transmitted by the separating clutch, and an actuating pressure for the clutch is determined depending on the power transmission factor, wherein the clutch is controlled with this actuating pressure.

The actual differential speed actually forming at the separating clutch is ascertained depending on this actuating pressure.

Depending on a deviation between the target differential speed and the actual differential speed, a corrected power transmission factor is determined with the aid of a controller.

Depending on the corrected power transmission factor and the internal combustion engine-driven torque to be transmitted, a corrected actuating pressure for the separating clutch is determined and the separating clutch is controlled with this corrected actuating pressure.

With the aid of the present invention, the comfort during the active slip decoupling can be increased. Depending on the deviation between the desired target differential speed of the separating clutch and an actual differential speed which is forming, a corrected power transmission factor is determined and is utilized for controlling the separating clutch, in that a corrected actuating pressure is ascertained depending on the corrected power transmission factor.

According to one refinement, the corrected power transmission factor is determined by the controller in such a way that the deviation between the target differential speed and the actual differential speed is virtually compensated for computationally or on the controller side. As a result, the comfort during an active slip decoupling can be increased particularly easily and advantageously.

Preferably, a torque offset is determined by the controller depending on the deviation between the target differential speed and the actual differential speed. This torque offset is taken into account with the internal combustion engine-driven torque to be transmitted in order to obtain a corrected torque to be transmitted. The corrected power transmission factor is determined depending on the corrected torque to be transmitted and on the target differential speed. The corrected power transmission factor determines the corrected actuating pressure. This refinement as well is utilized for easily and reliably increasing the comfort during an active slip decoupling.

According to one advantageous refinement, the power transmission factor is ascertained on the basis of a characteristic map stored on the control side depending on the target differential speed and depending on the internal combustion engine-driven torque to be transmitted by the separating clutch. Support points of the characteristic map are adapted depending on the corrected actuating pressure. Due to the adaptation of the support points of the characteristic map, the comfort during the active slip decoupling can be subsequently ensured even without intervention by the controller.

BRIEF DESCRIPTION OF THE DRAWINGS

Preferred refinements will become apparent from the dependent claims and the description which follows. Exemplary embodiments of the invention are explained in greater detail with reference to the drawings, without being limited thereto. In the drawings:

DETAILED DESCRIPTION

Figure 1:
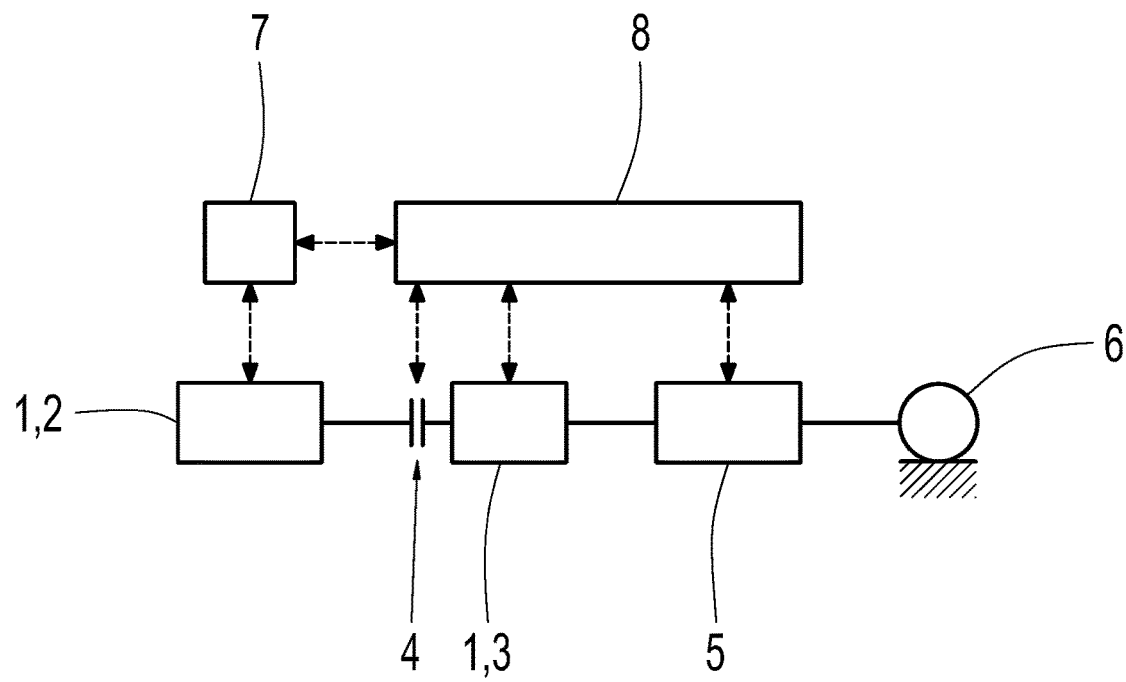
FIG. 1 shows an exemplary diagram of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Example aspects of the invention relate to a method and to a control unit for operating a motor vehicle designed as a hybrid vehicle.

FIG. 1 shows a block diagram of a drive train of a hybrid vehicle, wherein the hybrid vehicle includes a hybrid drive 1 formed from an internal combustion engine 2 and an electric motor or machine 3.

A transmission 5, in particular an automatic or automated transmission, is connected between the hybrid drive 1 and a driven end 6. The transmission 5 converts rotational speeds and torques and makes the available tractive force of the hybrid drive 1 available at the driven end 6.

A friction-locking separating clutch 4 is connected between the internal combustion engine and the electric machine 3. When the separating clutch 4 is disengaged, the internal combustion engine 1 is decoupled from the drive train. When the separating clutch 4 is engaged, the internal combustion engine 1 is coupled to the drive train.

FIG. 1 also shows an engine control unit 7 and a transmission control unit 8. The engine control unit 7 controls the operation of the internal combustion engine 1 by an open-loop and/or closed-loop system and, for this purpose, exchanges data with the internal combustion engine 1. In the exemplary embodiment shown, the transmission control unit 8 controls, by an open-loop and/or closed-loop system, the operation of the transmission 5, the electric machine 3, and the separating clutch 4. For this purpose, the transmission control unit 8 exchanges data with these assemblies, i.e., with the transmission 5, the electric machine 3, and the separating clutch 4. Furthermore, the transmission control unit 8 exchanges data with the engine control unit 7.

It is pointed out that the configuration of a drive train of a motor vehicle shown in FIG. 1 is of an exemplary nature. For example, the control of the electric machine 3 and of the separating clutch 4 can be taken over by a separate hybrid control unit.

Example aspects of the invention relate to a method with which a hybrid vehicle can be operated with a high level of comfort during an active slip decoupling. During an active slip decoupling, a defined target differential speed $\Delta n_{SOLL}$ is to set in the separating clutch 4, which is connected between the internal combustion engine 2 and the electric machine 3, with transmission of a desired, internal combustion engine-driven torque $M_{SOLL}$ to be transmitted. The desired, internal combustion engine-driven torque $M_{SOLL}$ to be transmitted can also be referred to as an internal combustion engine-driven target torque.

From practical experience, it is known that a power transmission factor and, depending on this power transmission factor, an actuating pressure for the separating clutch 4 are determined depending on the desired target differential speed $\Delta n_{SOLL}$ at the separating clutch 4, which is to set in during an active slip decoupling, and depending on the internal combustion engine-driven torque $M_{SOLL}$ to be transmitted by the separating clutch 4 in this case, wherein the separating clutch 4 is controlled with this actuating pressure.

The ascertainment of the power transmission factor depending on the target differential speed $\Delta n_{SOLL}$ and depending on the internal combustion engine-driven torque $M_{SOLL}$ to be transmitted by the separating clutch 4 takes place on the basis of a characteristic map stored in the control unit 8. This characteristic map was empirically ascertained in advance via testing and, in fact, by controlling the clutch with a defined actuating pressure on a test stand for internal combustion engine-driven torques which are made available, and ascertaining the differential speed forming at the separating clutch 4 in this case. The ratio of torque to be transmitted and actuating pressure determines the power transmission factor in this case. A power transmission factor is ascertained for multiple support points of torques to be transmitted and of differential speeds, and is stored in the characteristic map.

The following applies for this characteristic map-dependent ascertainment of the actuating pressure for the separating clutch 4: $p_{ANST}=M_{SOLL}/ÜF_{KENN}$, wherein $M_{SOLL}$ is the internal combustion engine-driven torque to be transmitted, wherein $ÜF_{KENN}$ is the power transmission factor, which has been determined from the characteristic map, for this internal combustion engine-driven torque to be transmitted and for the desired target differential speed $\Delta n_{SOLL}$, and wherein $p_{ANST}$ is the actuating pressure for the separating clutch.

Due to component tolerances and wear, the power transmission factors stored on the control side for the support points in the characteristic map can become inaccurate over time, and therefore the desired target slip or the desired target differential speed $\Delta n_{SOLL}$ cannot form at the separating clutch 4. This can result in the separating clutch 4 undesirably breaking loose or disengaging. Example aspects of the present invention relate to details with which this can be avoided.

Within the meaning of the present invention, it is provided that, when the separating clutch 4 is controlled with the aid of an actuating pressure $p_{ANST}$ during an active slip decoupling, the actuating pressure $p_{ANST}$ having been determined depending on a characteristic map-based power transmission factor, the actual differential speed $\Delta n_{IST}$ actually forming at the separating clutch 4 is ascertained depending on the actuating pressure.

Depending on a deviation between the target differential speed $\Delta n_{SOLL}$ and the actual differential speed $\Delta n_{IST}$, a corrected power transmission factor is determined with the aid of a controller 10 which is an integral part of the control unit 8 or is implemented therein, wherein a corrected actuating pressure for the separating clutch 4 is determined depending on the corrected power transmission factor and the internal combustion engine-driven torque $M_{SOLL}$ to be transmitted, wherein the separating clutch 4 is controlled with this corrected actuating pressure.

The corrected actuating pressure compensates for component tolerances or tolerances resulting from wear, and therefore, due to the utilization of the corrected actuating pressure, the desired target slip or the slip differential speed $\Delta n_{SOLL}$ forms at the separating clutch 4 depending on the internal combustion engine-driven $M_{SOLL}$ to be transmitted.

Figure 2:
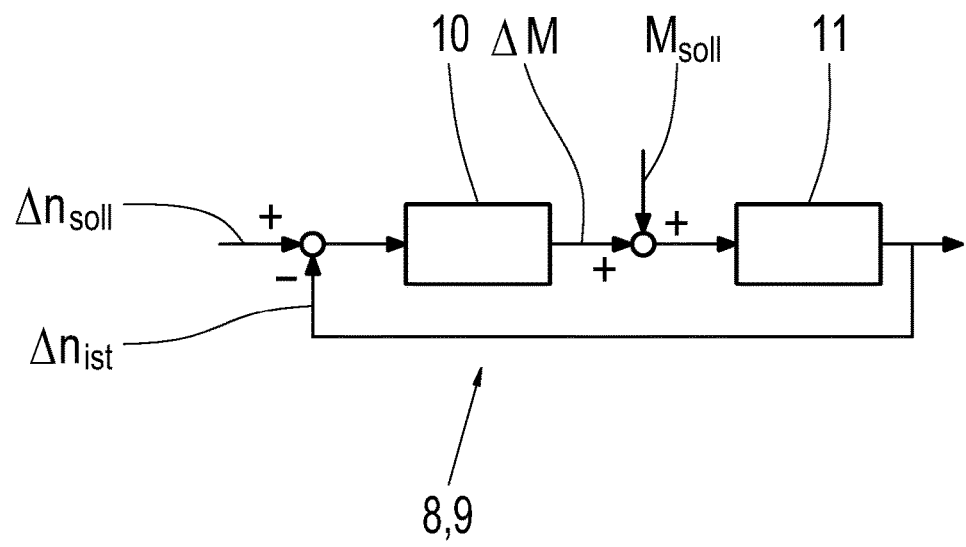
FIG. 2 shows a detail from FIG. 1.

FIG. 2 shows a block diagram for illustrating further details of the invention.

FIG. 2 visualizes details in this case, which relate to the determination of the corrected power transmission factor for the separating clutch 4 and the determination of the corrected actuating pressure for the separating clutch 4.

FIG. 2 shows the controller 10, to which the deviation between the target differential speed $\Delta n_{SOLL}$ and the actual differential speed $\Delta n_{IST}$ at the separating clutch 4 is made available as an input parameter.

The controller 10 is a PID controller, in particular.

The controller 10 ascertains a torque offset $\Delta M$ as the output parameter. This torque offset $\Delta M$ is additively superposed with the internal combustion engine-driven torque $M_{SOLL}$ to be transmitted and is made available to the control path 11 as an input parameter.

Depending on the sum of the internal combustion engine-driven torque $M_{SOLL}$ and the torque offset $\Delta M$ and depending on the desired target differential speed $\Delta n_{SOLL}$ which is to set in at the separating clutch 4 during an active slip decoupling, a new power transmission factor for the separating clutch 4 is determined on the basis of the characteristic map implemented in the control unit 8. A new actuating pressure for the separating clutch 4 is determined on the basis of this new power transmission factor.

In this case, the control path 11 is a system-dynamic model of the separating clutch 4. In the control circuit 9 from FIG. 2, the torque offset $\Delta M$ is computationally varied by the controller 10 for as long as it takes and, depending thereon, a new power transmission factor is determined from the characteristic map for as long as it takes until the actual differential speed $\Delta n_{IST}$ corresponds to the target differential speed $\Delta n_{SOLL}$ on the controller side or computationally via the control of the virtual control path 11.

Depending on this torque offset $\Delta M$ determined by the controller and depending on the internal combustion engine-driven torque $M_{SOLL}$ to be transmitted, the corrected power transmission factor is ascertained and, depending on the corrected power transmission factor, the corrected actuating pressure is ascertained, which is then utilized in the real system for controlling the separating clutch 4.

The following applies for this characteristic map-dependent ascertainment of the corrected actuating pressure for the separating clutch 4: $p_{ANST-KORR}=(M_{SOLL}+\Delta M)/\text{ÜF}_{KENN-KORR}$, wherein $M_{SOLL}$ is the internal combustion engine-driven torque to be transmitted, wherein $\Delta M$ is the torque offset determined by the controller, in which the actual differential speed $\Delta n_{IST}$ computationally corresponds to the target differential speed $\Delta n_{SOLL}$, wherein $\text{ÜF}_{KENN-KORR}$ is the power transmission factor, which is determined from the characteristic map, for the torque $M_{SOLL}+\Delta M$ and for the desired target differential speed $\Delta n_{SOLL}$, and wherein $p_{ANST-KORR}$ is the corrected actuating pressure for the separating clutch.

By utilizing the corrected actuating pressure $p_{ANST-KORR}$, the desired target slip $\Delta n_{SOLL}$ for the internal combustion engine-driven torque $M_{SOLL}$ to be transmitted sets in at the separating clutch 4.

Preferably, support points of the characteristic map are adapted depending on the corrected actuating pressure ascertained in the above-described way. This has the advantage that, as a result, a characteristic map stored on the control side can be continuously adapted during the operation in order to compensate for component tolerances and with compensation for wear, and therefore the comfort during the active slip decoupling can always be ensured within the shortest time.

The following applies for the adaptation of the support points of the characteristic map stored in the control unit: $\text{ÜF}_{KENN-NEU}=M_{SOLL}/p_{ANST-KORR}$, wherein $M_{SOLL}$ is the internal combustion engine-driven torque to be transmitted, wherein $p_{ANST-KORR}$ is the corrected actuating pressure for the separating clutch, and wherein $\text{ÜF}_{KENN-NEU}$ is the power transmission factor adapted for the particular support points of the characteristic map.

Example aspects of the invention also relate to a control unit for carrying out the method according to the invention, wherein this control unit can be, in particular, an electronic transmission control unit 8 or also a separate electronic hybrid control unit. The control unit 8 carries out the method according to the invention on the control side.

The control unit 8 ascertains a power transmission factor during an active slip decoupling, determines an actuating pressure depending on the power transmission factor and, depending on the actuating pressure, determines an actual differential speed forming at the separating clutch 4. The control unit 8 further determines, depending on the deviation between the target differential speed $\Delta n_{SOLL}$ and the actual differential speed $\Delta n_{IST}$, the corrected power transmission factor with the aid of the controller 10 and, in fact, in the way described above. Depending on the corrected power transmission factor, the control unit 8 determines a corrected actuating pressure for the separating clutch 4, with the aid of which the control unit 8 then subsequently controls the separating clutch 4.

The control unit includes hardware-side and software-side means for implementing the method. The hardware-side means include data interfaces in order to exchange data with the assemblies contributing to the implementation of the method according to the invention, such as with the separating clutch 4 and the engine control unit 7. The control unit 8 includes a processor for data processing and a memory for data storage as further hardware-side means. The software-side means include program components for implementing the method according to the invention.

Modifications and variations can be made to the embodiments illustrated or described herein without departing from the scope and spirit of the invention as set forth in the appended claims.

REFERENCE CHARACTERS 1 hybrid drive
2 internal combustion engine
3 electric machine
4 separating clutch
5 transmission
6 driven end 7 engine control unit
8 transmission control unit
9 control circuit
10 controller
11 control path

The invention claimed is:

1. A method for operating a motor vehicle having a hybrid drive (1) with an internal combustion engine (2), an electric motor (3), a separating clutch (4) connected between the internal combustion engine (2) and the electric motor (3) and a transmission (5) connected between the hybrid drive (1) and a driven end (6), the method comprising:
   when a defined target differential speed is set for the separating clutch (4), determining a power transmission factor depending on the defined target differential speed and an internal combustion engine-driven torque to be transmitted by the separating clutch (4);
   determining an actuating pressure for the separating clutch (4) depending on the power transmission factor;
   controlling the separating clutch (4) according to the actuating pressure;
   ascertaining an actual differential speed forming at the separating clutch (4) with the actuating pressure;
   determining a corrected power transmission factor with a controller (10) depending on a deviation between the defined target differential speed and the actual differential speed;
   determining a corrected actuating pressure for the separating clutch (4) depending on the corrected power transmission factor and the internal combustion engine-driven torque to be transmitted; and
   controlling the separating clutch (4) according to the corrected actuating pressure.

2. The method of claim 1, wherein determining the corrected power transmission factor comprises determining the corrected power transmission factor with the controller (10) such that the deviation between the defined target differential speed and the actual differential speed is computationally compensated for by the controller (10).

3. The method of claim 1, wherein determining the corrected power transmission factor comprises:
   determining a torque offset with the controller (10) depending on the deviation between the defined target differential speed and the actual differential speed;
   obtaining a corrected torque to be transmitted depending on the torque offset and the internal combustion engine-driven torque to be transmitted; and
   determining the corrected power transmission factor depending on the corrected torque to be transmitted and the defined target differential speed.

4. The method of claim 1, wherein determining the power transmission factor comprises determining the power transmission factor on the basis of a characteristic map stored on a control side depending on the defined target differential speed and the internal combustion engine-driven torque to be transmitted.

5. The method of claim 4, further comprising adapting support points of the characteristic map depending on the corrected actuating pressure.

6. A control unit (8) for operating a motor vehicle having a hybrid drive (1) with an internal combustion engine (2), an electric motor (3), a separating clutch (4) connected between the internal combustion engine (2) and the electric motor (3) and a transmission (5) connected between the hybrid drive (1) and a driven end (6), the control unit (8) configured to:
   when a defined target differential speed is set for the separating clutch (4), determine a power transmission factor depending on the defined target differential speed and an internal combustion engine-driven torque to be transmitted by the separating clutch (4);
   determine an actuating pressure for the separating clutch (4) depending on the power transmission factor;
   control the separating clutch (4) according to the actuating pressure;
   ascertain an actual differential speed forming at the separating clutch (4) with the actuating pressure;
   determine a corrected power transmission factor with a controller (10) of the control unit (8) depending on a deviation between the defined target differential speed and the actual differential speed;
   determine a corrected actuating pressure for the separating clutch (4) depending on the corrected power transmission factor and the internal combustion engine-driven torque to be transmitted; and
   control the separating clutch (4) according to the corrected actuating pressure.

7. The control unit of claim 6, wherein the controller (10) determines the corrected power transmission factor such that the deviation between the defined target differential speed and the actual differential speed is compensated for.

8. The control unit of claim 6, wherein the control unit (8) is further configured to:
   determine a torque offset depending on the deviation between the defined target differential speed and the actual differential speed with the controller (10);
   obtain a corrected torque to be transmitted depending on the torque offset and the internal combustion engine-driven torque to be transmitted; and
   determine the corrected power transmission factor depending on the corrected torque to be transmitted and the defined target differential speed.

9. The control unit of claim 6, wherein the control unit (8) is further configured to ascertain the power transmission factor on the basis of a characteristic map stored on a control side depending on the defined target differential speed and on the internal combustion engine-driven torque to be transmitted.

10. The control unit of claim 9, wherein the control unit (8) is further configured to adapt support points of the characteristic map depending on the corrected actuating pressure.

* * * * *